US011868814B2

(12) United States Patent
Kantake et al.

(10) Patent No.: US 11,868,814 B2
(45) Date of Patent: Jan. 9, 2024

(54) INFORMATION PROCESSING APPARATUS

(71) Applicant: KABUSHIKI KAISHA TOSHIBA, Tokyo (JP)

(72) Inventors: Toshiyuki Kantake, Tokyo (JP); Jun Kanai, Tokyo (JP); Tatsuya Uehara, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 491 days.

(21) Appl. No.: 17/249,340

(22) Filed: Feb. 26, 2021

(65) Prior Publication Data
US 2022/0050727 A1    Feb. 17, 2022

(30) Foreign Application Priority Data

Aug. 11, 2020  (JP) .................... 2020-135907

(51) Int. Cl.
*G06F 9/455* (2018.01)
*G06F 9/50* (2006.01)
(52) U.S. Cl.
CPC ........ *G06F 9/5077* (2013.01); *G06F 9/45558* (2013.01); *G06F 2009/45562* (2013.01)
(58) Field of Classification Search
CPC ............... G06F 9/5077; G06F 9/45558; G06F 2009/45562
See application file for complete search history.

(56) References Cited

U.S. PATENT DOCUMENTS 7,886,301 B2    2/2011  Sheehan

FOREIGN PATENT DOCUMENTS

JP          5437238 B2    3/2014

*Primary Examiner* — Gregory A Kessler
(74) *Attorney, Agent, or Firm* — Finnegan, Henderson, Farabow, Garrett & Dunner, LLP

(57) ABSTRACT

An information processing apparatus that is one embodiment of the present invention: detects execution of software in any of a host environment, and one or more virtual environments; and acquires discrimination information indicating that a detected environment is a first environment, and first name information indicating a name of the software in a name space of the first environment. The information processing apparatus acquires, based on the discrimination information, second name information indicating a name of the first environment in a name space of a second environment. The information processing apparatus converts, based on the second name information, the first name information into third name information indicating a name of the software in the name space of the second environment. The information processing apparatus acquires, based on the third name information, information on the software from an accessible resource.

16 Claims, 16 Drawing Sheets

| ID OF VIRTUAL ENVIRONMENT | PROCESS ID OF VIRTUAL ENVIRONMENT | PATH OF VIRTUAL ENVIRONMENT IN MONITOR ENVIRONMENT |
|---|---|---|
| container1 | 357017 | /virtual /container1/ |
| container2 | 502304 | /virtual /container2/ |
| container3 | 780945 | /virtual /container3/ |
| container4 | 902709 | /virtual /container4/ |
| container5 | 784901 | /virtual /container5/ |

FIG. 2

| ID OF VIRTUAL ENVIRONMENT OR HOST ENVIRONMENT | inode NUMBER | HASH VALUE | PATH OF SOFTWARE IN MONITOR ENVIRONMENT |
| --- | --- | --- | --- |
| container1 | 176899 | aef1···deea | /virtual /container1/bin/ls |
| container1 | 902394 | aefe···d999 | /virtual /container1/bin/cat |
| container1 | 853210 | ie91···9313 | /virtual /container1/bin/bash |
| container2 | 859681 | b86a···bsaa | /virtual /container2/bin/ls |
| container3 | 883140 | i9sf···safd | /virtual /container3/bin/bash |

FIG. 4

| PATH OF SOFTWARE IN VIRTUAL ENVIRONMENT | HASH VALUE OF SOFTWARE |
|---|---|
| /bin/ls | edf1⋯dddd |
| /bin/cat | fe12⋯eab5 |
| /bin/bash | fd82⋯9313 |

FIG. 5

INFORMATION PROCESSING APPARATUS

CROSS-REFERENCE TO RELATED APPLICATION (S)

This application is based upon and claims the benefit of priority from Japanese Patent Application No. 2020-135907, filed Aug. 11, 2020; the entire contents of which are incorporated herein by reference.

FIELD

Embodiments described herein relate generally to an information processing apparatus.

BACKGROUND

As one of virtualization technologies, there is a technology that creates a plurality of virtual environments that share resources in a host environment. In the technology, for example, resources required to execute applications such as executable files, and libraries are shared by a plurality of virtual environments.

The virtual environment may manage the resources it stores by the name. For example, when the virtual environment accepts an application execution instruction, the virtual environment accesses the resource concerning the application with the name set in the virtual environment and performs processing. The virtual environment has a name space independent of the host environment and other virtual environments. Consequently, when accessing the same resource between the host environment and the virtual environment, or among the virtual environments, it is necessary to use a name in each of the name spaces, that is, a path. This property is suitable for monitoring resources in a specific environment, in the specific environment, but is not suitable for monitoring resources in other environments from the specific environment. For example, a resource that is managed under the name "/home/usr/app" in a monitored environment may be managed under the name "/virtual/contents/app" in a monitor environment. In this case, it is difficult to monitor the resource in the monitored environment from the inside of the monitor environment.

BRIEF DESCRIPTION OF THE DRAWINGS

FIG. 2 is a diagram illustrating an example of an environment information list;

FIG. 4 is a diagram illustrating an example of a check list;

FIG. 5 is a diagram illustrating an example of a pre-registration list;

DETAILED DESCRIPTION

One embodiment of the present invention is an information processing apparatus capable of providing a host environment, and one or more virtual environments, and acquires information on software in a second environment to control the software actuated in a first environment.

An information processing apparatus that is one embodiment of the present invention: detects execution of software in any of a host environment, and one or more virtual environments; and acquires discrimination information indicating that a detected environment is a first environment, and first name information indicating a name of the software in a name space of the first environment. The information processing apparatus acquires, based on the discrimination information, second name information indicating a name of the first environment in a name space of a second environment. The information processing apparatus converts, based on the second name information, the first name information into third name information indicating a name of the software in the name space of the second environment. The information processing apparatus acquires, based on the third name information, information on the software from an accessible resource.

Below, a description is given of embodiments of the present invention with reference to the drawings. The present invention is not limited to the embodiments.

First Embodiment

Figure 1:
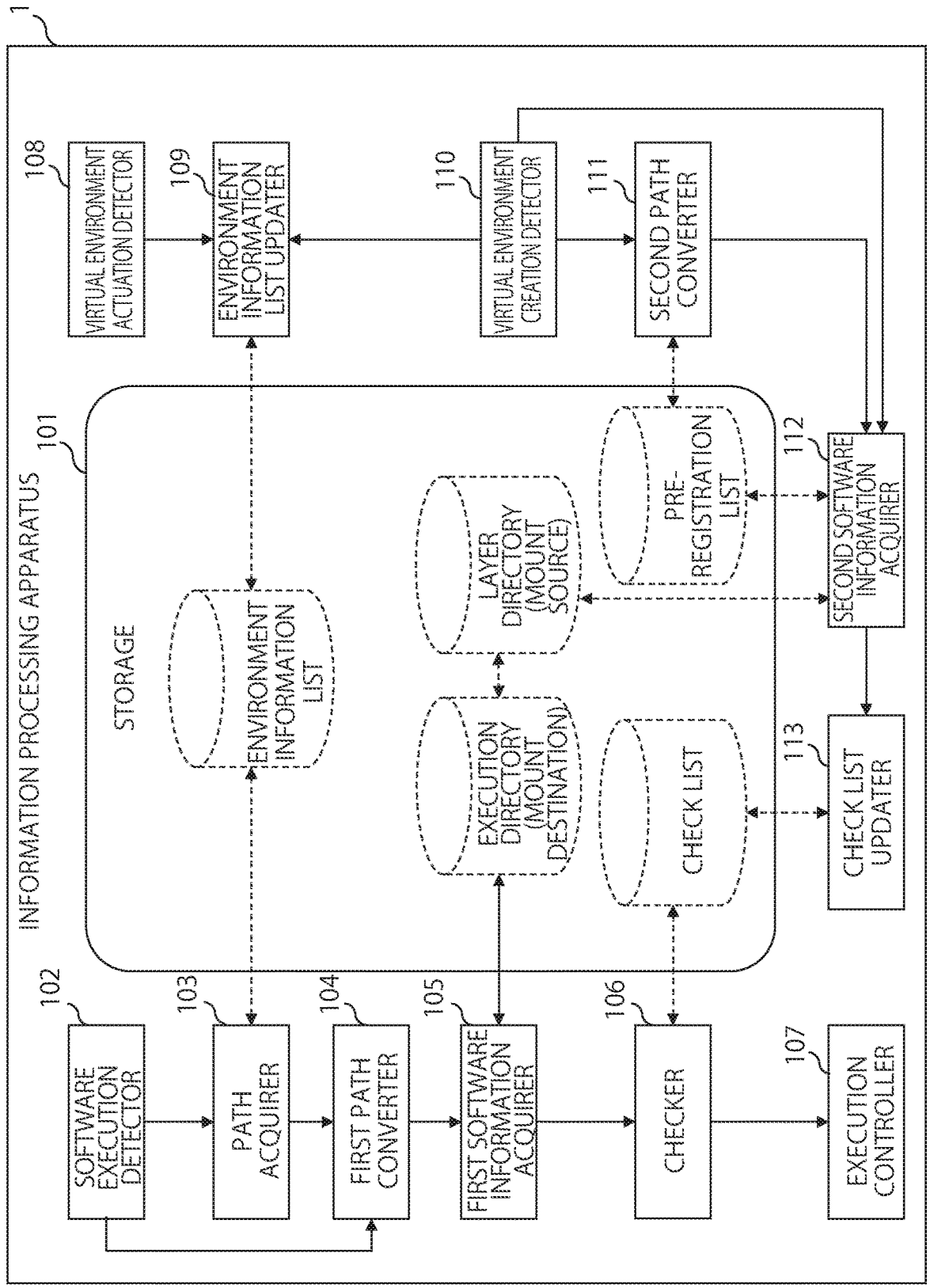
FIG. 1 is a block diagram illustrating an example of an information processing apparatus relating to a first embodiment.

FIG. 1 is a block diagram illustrating an example of an information processing apparatus relating to a first embodiment. The information processing apparatus relating to the first embodiment includes a storage 101, a software execution detector 102, a path acquirer (name information acquirer) 103, a first path converter 104, a first software information acquirer 105, a checker 106, an execution controller 107, a virtual environment actuation detector 108, an environment information list updater 109, a virtual environment creation detector 110, a second path converter 111, a second software information acquirer 112, and a check list updater 113.

The information processing apparatus 1 of the present embodiment is a device capable of providing one or more virtual environments. In the virtual environment created by the information processing apparatus 1, software is executable. However, the information processing apparatus 1 detects the software that is executed in the virtual environment, and confirms whether the detected software can be executed. When it is confirmed that the software can be executed, the software is executed. The information processing apparatus 1 protects the virtual environment by performing execution control to the software that is executed in the virtual environment in this way.

Note that the information processing apparatus may detect not only the software executed in the virtual environment but also software executed in a host environment, or may control execution of the software. Control of execution may be performed in the host environment, and may be performed in the virtual environment. For example, when a virtual environment A, and a virtual environment B are created, execution control may be performed in any of the host environment, the virtual environment A, and the virtual environment B. However, in consideration of cost of software for performing execution control, a load on the information processing apparatus 1, and the like, execution control in the present embodiment is performed in an integrated manner in any of the host environment and one or more virtual environments. In the present explanation, an environment that is any of the host environment and one or more virtual environments, where execution control performed, is described as a monitor environment. Further, in the present explanation, an environment that is any of the host environment and one or more virtual environments, and is the environment where execution control is performed is described as a monitor environment. Further, in the present explanation, an environment that is any of the host environment and one or more virtual environments, and is the environment where detected software is executed is described as an execution environment.

Further, in the present embodiment, in order to protect the execution environment more, it is also confirmed whether a software execution file or the like is not falsified. This is because even if the detected software should be permitted, it may be considered that settings of the software have been falsified, and with the falsified settings, the software is not always safe.

For the purpose of the above described confirmation, a check list in which information concerning software is stored is used. For example, white list type execution control may be performed, in which execution of software is permitted only when information shown by the check list and information at a detection time point of the detected software match each other. Alternatively, black list type execution control may be performed, in which execution of software is permitted when the information shown by the check list and the information at the detection time point of the detected software do not match each other. The information processing apparatus 1 may accept a use purpose of the check list.

As the information on software, for example, information on values of software that are individual for even a same kind of software such as an inode number, and a hash value, information on values that change according to settings or the like, and the like are assumed. Note that creation of the inode number, the hash value and the like is performed in executed software, management software in the virtual environment, and does not have to be created by components of the present embodiment. Alternatively, when the check list is automatically created, the second software information acquirer 112 or the like may create the check list. A hash value may be created by using an ordinary hash algorism such as sha-256 and sha512 from a content of the execution file of the software, or the like.

The information on the detection time point of the detected software can be acquired from a resource such as an execution file of the software at the detection time point. Therefore, it is necessary to access the resource of the software, and it is necessary to recognize a place where the resource is stored. The place where the resource is stored, which is seen from the monitor environment, is known from information indicating a name of the resource in a name space of the monitor environment. The information is generally referred to as a path. In other words, the place where the resource being stored, which is seen from the monitor environment is expressed by the path of the resource in the monitor environment. The path of the resource can be acquired by executing different software B in the monitor environment, and extracting information on software A by the software B, when execution command to the software A is performed in the monitor environment, for example.

However, when the monitor environment and the execution environment are different, it is difficult to recognize the path of the resource of the software A in the monitor environment. This is because the path of the resource of the software A acquired by the software B is a path in the execution environment. In order to access the execution file from the monitor environment, a path in the monitor environment is required, and it is not possible to access the execution file by using the path in the execution environment. If the path in the execution environment is used, it may be possible to accidentally access another resource by mistake.

Accordingly, it has been necessary to make the monitor environment the same as the execution environment. In other words, it has been necessary to perform execution control in an environment where software desired to be detected is executed. More specifically, it has been necessary to install software that performs execution control in each of a plurality of virtual environments that are desired to be protected. However, as the number of virtual environments increases, the cost to the execution control software increases. Further, the sizes of the respective virtual environments also increase, and as the number of virtual environments increases, the resource required of the information processing apparatus 1 also increases.

On the other hand, the information processing apparatus 1 of the present embodiment acquires the path of the resource of the software in the monitor environment, in other words, a name of the resource of the software in a name space of the monitor environment, even when the execution environment and the monitor environment are different. Thereby, it is possible to access the resource in the execution environment from the monitor environment. Execution control to many environments from one environment is enabled.

As the resource, a program that is stored in a format of an execution file, and actuates software of a detection target is assumed. A file or the like including data or the like to which the program or the actuated software refers is also assumed. The resource is assumed to be shared by the host environment and the virtual environments. That is to say, it is assumed to be possible to access the resource from both the monitor environment and the execution environment. Note that hereinafter, the path of the resource of the software is simply described as the path of the software.

The check list includes at least software that is permitted or unpermitted to execute, and information concerning the software. For example, the aforementioned inode number, hash value and the like are included, and are compared with the inode number, hash value and the like at the detection time point that are obtained by accessing the resource. Note that software permitted to execute and information on the software may differ at each execution environment. Note that registration of software to the check list means recording information on the software in the check list and updating the check list.

Note that the information processing apparatus 1 of the present embodiment detects creation of a new virtual environment to update the check list, and makes it possible to perform execution control of the software to not only the existing virtual environments but also the new virtual environment.

Details of an internal configuration of the information processing apparatus 1 will be described. Note that components illustrated in FIG. 1 are to perform execution control of software, and other components are omitted. For example, a creator of the virtual environment is omitted. The respective components of the information processing apparatus 1 illustrated in FIG. 1 may be subdivided or aggregated. For example, the storage 101 may be divided according to files or the like that is stored. Further, the components other than the storage 101 may be regarded as an arithmetic operator. A processing result of each of the components may be transmitted to a component where next processing is performed, or may be stored in the storage 101, and the component in which the next processing is performed may access the storage 101 and acquire a processing result.

The storage 101 stores files and the like used by the information processing apparatus 1. In FIG. 1, as the files for performing execution control of software, an environment information list, a check list, and a pre-registration list are illustrated. Further, an execution directory that is a directory including files for realizing the virtual environment, and a layer directory that is a directory including original files of the files are illustrated. Other files than these files are omitted.

The software execution detector 102 detects execution of software. The detection can be realized by various measures. For example, it is possible to detect execution of software by using a mechanism of an OS (operating system) called hook. It is possible to insert arbitrary processing in a preset spot in a program by using the hook. For example, in Linux (registered trademark) that is a kind of OS, it is possible to execute a function (can also be said as a program) registered in advance before execution of a system call for calling software, by using the hook. By using this, a hook is set to at least one of system calls indispensable for execution of software, and when predetermined processing is performed by the hook, it may be determined that execution of software is detected. Further, execution of software detected by the hook is suspended, so that it is possible to prevent software that should not be permitted from continuing to be executed.

The software execution detector 102 acquires information on the detected software. For example, the software execution detector 102 acquires a path of the detected software. Note that the path that is acquired is a path in the execution environment. Further, the software execution detector 102 acquires information for identifying the execution environment of the detected software, for example. As the information, a process ID (PID) of a virtual environment is cited, for example. The process ID is an individual ID that is assigned to each software under execution. Since the virtual environment is also realized by software, a process ID is also assigned to the virtual environment.

These kinds of information can be acquired by using a hook in the same way as the detection method of software, for example. For example, in the aforementioned Linux, a hook makes it possible to not only insert processing before execution of a system call, but also acquire data held by the system call, for example, arguments, internal variables, a path and a process ID of the software, and the like. Further, it is also possible to acquire a parent process ID (PPID) from the process ID of software. The parent process ID is a process ID of upper software used to execute software. An upper parent process ID of the parent process ID can also be acquired. In this way, the parent process ID of the detected software can be traced. When the execution environment is a virtual environment, a process ID of the virtual environment is finally reached. Accordingly, the process ID of the virtual environment is acquirable.

The path acquirer 103 acquires a path of an execution environment in the monitor environment from an environment information list by using discrimination information capable of discriminating the execution environment such as a process ID of the virtual environment. Note that the path acquirer 103 may acquire not only the path of the execution environment but also information concerning the execution environment included in the environment information list.

FIG. 2 is a diagram illustrating an example of the environment information list. The environment information list includes at least discrimination information of virtual environments such as process IDs of the virtual environments, and paths of the virtual environments in the monitor environment, and the discrimination information of the virtual environments and the paths of the virtual environments are stored so that correspondence of them is understandable. A first column from a left side in FIG. 2 indicates individual IDs of the virtual environments. The IDs of the virtual environments also correspond to the information for discriminating the virtual environments. In an example of FIG. 2, information concerning five virtual environments from "container1" to "container5" is illustrated. A third column from the left side in FIG. 2 indicates paths of the virtual environments in the monitor environment. Note that the example in FIG. 2 illustrates a case where the monitor environment is a host environment.

In FIG. 2, "process ID" that is a second item from the left side indicates process IDs of the virtual environments. The path acquirer 103 acquires the paths of the virtual environments in the monitor environment with the process IDs of the virtual environments as keys from the table as in FIG. 2. For example, when the process ID acquired from the software execution detector 102 is "357017", "/virtual/container1/" is acquired as the path of the virtual environment because the process ID of "357017" is included in a first row from a top. Note that information included in the same row may be acquired, and, for example, "container1" may be acquired as the ID of the virtual environment. In this way, the ID of the virtual environment may be acquired in the software execution detector 102, or may be acquired in the path acquirer 103.

Note that hereinafter, a group of associated information will be described as a dataset in each of lists. For example, one row encircled by a thick frame in FIG. 2 corresponds to one dataset.

Further, when the process ID of the virtual environment detected by the software execution detector 102 does not exist in the environment information list stored by the storage 101, it is determined that the detected software is executed in the host environment. When the path of the host environment is registered to the environment information list, it is possible to acquire the path in the monitor environment even when the detected software is executed in the host environment.

Note that a method of processing of search, registration, edit, and deletion of information to the table as illustrated in FIG. 2 may be an ordinary method, and is not specially limited. The same applies in lists that will be explained hereinafter.

Figure 3:
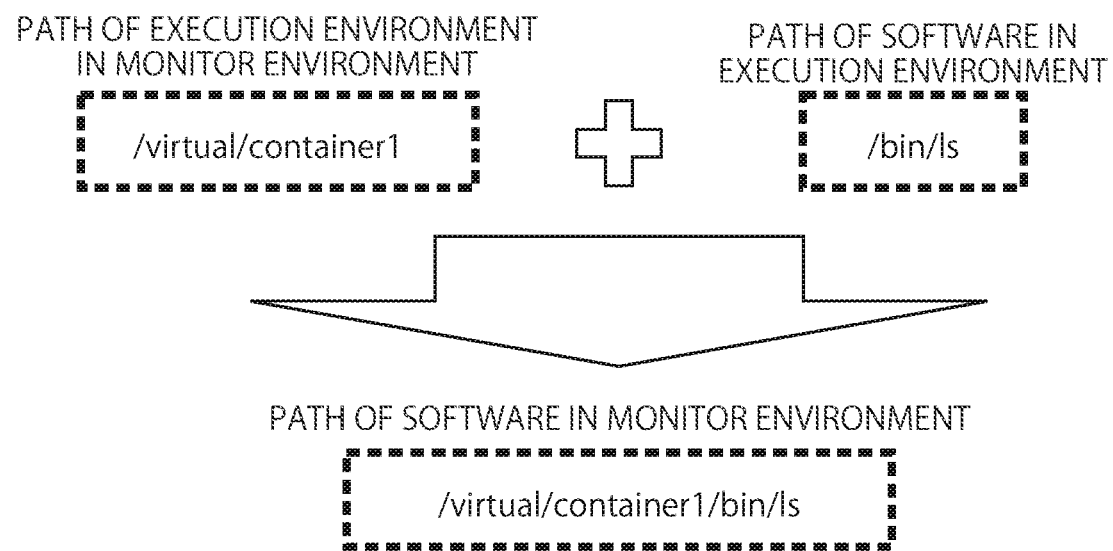
FIG. 3 is a diagram explaining path conversion.

The first path converter 104 converts the path in the execution environment, of the detected software into a path in the monitor environment by using the path of the execution environment in the monitor environment. FIG. 3 is a diagram explaining conversion of the path. In an example of FIG. 3, it is assumed that the monitor environment is a host environment, the execution environment is "container1", and the path of the "container1" in the host environment is "/virtual/container1". A path in the execution environment, of the detected software is assumed to be "/bin/ls". In this case, "/bin/ls" is a path under a directory of "/virtual/container1", and therefore it is possible to create a path in the host environment, of the detected software by combining these paths. In other words, "/virtual/container1/bin/ls" is the path in the monitor environment, of the detected software.

The first software information acquirer 105 accesses the storage 101, and acquires information at a detection time point of the detected software from a resource existing in the path in the monitor environment, of the detected software. The information that is acquired is information that is checked by using the check list, and is set in advance. For example, the information that is acquired may be an inode number, a hash value, a device number and the like. Note that the first software information acquirer 105 does not have to acquire information already acquired by the other components such as the software execution detector 102, the path acquirer 103, and the first path converter 104.

Note that a file existing in the path in the monitor environment, of the detected software can exist in another path. For example, there may be a case where the file is copied and is stored in a specific directory for the purpose of backup or the like. In such a case, the first software information acquirer 105 may access the copied file and acquire the information. In that case, the first path converter 104 may further convert the path in the monitor environment, of the detected software into a storage destination directory of the copied file. In other words, the information at the detection time point can be acquired from the accessible file based on the path. The file under the storage destination directory of the copied file is included in the accessible file based on the path.

The checker 106 accesses the check list stored in the storage 101, checks the information at the detection time point of the detected software and the information registered in the check list of the detected software, and finds presence or absence of a difference.

FIG. 4 is a diagram illustrating an example of the check list. In the present embodiment, values indicating IDs of environments in which execution of software is permitted, inode numbers of the software, hash values of the software, and paths of the software are stored in an associated form. The information registered in the check list may be properly changed.

For example, when the path in the monitor environment of the detected software is "/virtual/container3/bin/bash", the checker 106 searches in the check list with the path as a key, and tries to detect a dataset including the path. When the dataset including the path is detected, it is confirmed whether values of respective items in the detected dataset correspond to the information at the detection time point of the detected software. For example, the dataset including "/virtual/container3/bin/bash" includes the inode number "883140", and the hash value of "i9sf . . . safd". It is confirmed whether these values correspond to values at the detection time point of the detected software. When the dataset including the path is not detected, a notice that the dataset is not detected is given to the execution controller 107.

Further, as described above, execution control may be performed to the software executed in the host environment, and therefore, the ID, path and the like of not only the virtual environment but also the host environment may be included in the check list.

In FIG. 4, the check list includes information on a plurality of virtual environments in one table, but the table may be divided according to the virtual environments. Alternatively, the table may be divided according to software. Further, the check list may be configured by a plurality of files, and information on the virtual environment allocated may be recorded in each of the files. In that case, the checker 106 can detect a table or a file relating to the corresponding virtual environment from the plurality of tables or files by a method of ordinary data search or file search, and can perform check processing to the detected table or file. The other lists may be divided into a plurality of tables or files in the same way.

The execution controller 107 determines whether or not to permit execution of the detected software based on the result of check. For example, when the check list is used as a white list, the execution controller 107 recognizes that the software is falsified when there is even one difference in information as a result of check, and can determine not to permit execution of the detected software. Note that even when there is a difference in information, execution of the detected software may be permitted depending on the differing information. Depending on the right of the executor of software, a control content may differ. When the check list is used as a black list, execution of the detected software may be determined not to be permitted when there is no difference in information as a result of check, for example.

When execution of the detected software is permitted, execution of the detected software is suspended, but the suspension may be cancelled. Alternatively, re-execution of the detected software may be performed. For example, when execution of the software is suspended by insertion processing by the hook before execution of some system calls, as described above, cancellation of the suspension may be performed by returning a specific return value to the insertion processing. When execution of the software is permitted, the return value for cancelling the suspension is returned, and when execution of the software is not permitted, a return value for executing stop of the suspended software may be returned.

In this way, the execution controller 107 can control execution based on the information at the detection time point of the detected software, regardless of the environment in which the detected software is executed. Accordingly, the execution controller 107 does not have to exist in each of the virtual environments.

As described above, in order to acquire the path of the detected software, the environment information list is used, and every time a virtual environment is created or actuated, the environment information list may be automatically updated. For example, a process ID is assigned to each software under execution, but when execution of the software stops, the process ID disappears. When the software is executed again, the same process ID is not assigned. Accordingly, a process ID of the virtual environment after restart differs from the process ID registered in the environment information list. In this way, there is information that is updated at each actuation of the virtual environment. Accordingly, it is preferable that actuation of the virtual environment is detected, and the environment information list is automatically updated.

The virtual environment actuation detector 108 detects actuation of a virtual environment and acquires information on the actuated virtual environment, in order to automatically update the environment information list. The environment information list updater 109 updates the environment information list based on the information. In this way, the environment information list is prepared before detection of the software by the software execution detector 102.

The virtual environment creation detector 110 detects creation of the virtual environment and acquires information on the created virtual environment, in order to automatically update the environment information list. The environment information list updater 109 adds a dataset of the created virtual environment to the environment information list based on the information.

Information on the virtual environment acquired by the virtual environment creation detector 110 includes, for example, an ID of the virtual environment, a path of the virtual environment in the monitor environment, a path of a directory (mount source) in which a group of software to be mounted in the virtual environment is stored and the like. The directory is referred to as a layer directory. The virtual environment is realized by mounting the layer directory in the directory that is an entity of the virtual environment.

As an example of an acquisition method of ID of a virtual environment, there is a method that uses management software that manages the virtual environment. For example, a text file or the like concerning the software of the virtual environment is often included in a directory with a name including the ID of the virtual environment, and a path of the directory, ID of the virtual environment and the like are often shown in the file. By using the information on the file path of the entity of the virtual environment, it is possible to acquire the ID of the corresponding virtual environment.

For example, when a virtual environment with an ID "container1" is created, the virtual environment creation detector 110 acquires the ID called "container1" and a path of "container1". The environment information list updater 109 adds a dataset including the ID and the path of "container1" to the environment information list. When the dataset of "container1" already exists, the dataset can be overwritten. Further, when the virtual environment of "container1" is actuated, the virtual environment actuation detector 108 acquires the ID called "container1", and a process ID of "container1". The environment information list updater 109 detects the dataset including "container1" from the environment information list, and updates information in the dataset such as the process ID of the virtual environment. When the virtual environment is actuated first, the process ID of the virtual environment is not described in the environment information list, and therefore, the process ID is added, whereas when actuation of the virtual environment is not for the first time, the process ID described in the environment information list can be overwritten.

As a method for detecting creation of the virtual environment, there is a method using the aforementioned hook. For example, there is a method for causing software to be executed independently of the monitor environment by creating a mount directory (mount destination) and mounting a layer directory (mount source) to the directly, and creation of the virtual environment may be detected by inserting processing using a hook to a system call performing the mount processing. For example, in Linux, paths of a mount source and a mount destination are inputted, a mount system call with these paths as arguments is executed, and mount processing is executed. Accordingly, by inserting processing to the mount system call, it is possible to acquire the paths of the mount destination and the mount source that are transferred to the mount system call while detecting creation of the virtual environment.

Further, management software configured to manage a virtual environment may manage a path of the virtual environment and an ID of the virtual environment by associating the path with the ID. In that case, these kinds of information may be acquired via the management software. Alternatively, a file created or updated by the management software is monitored, and when the file is created or updated, information on the virtual environment may be acquired from the file. For example, a system call that creates or updates the file is detected by using a hook, and a directory name and a path created by the system call may be acquired. Further, for each of system calls that are executed, whether the system call is to create a new virtual environment or not may be confirmed. For example, when a predetermined character string is inserted in a part of the path of the directory created by the system call, it may be determined that the system call is for creation of a new virtual environment. For example, when a directory expressed by a path called "/home/virtual_data/container1" is created under a directory expressed by a path called "/home/virtual_data/", a virtual environment of an ID called "container1" is recognized to be created, and information on "container1" may be acquired from a file under "/home/virtual_data/container1".

Note that mount processing can occur other than creation of a virtual environment. Accordingly, when information concerning the path of the layer directory that is a mount source is obtained when mount processing is detected, the mount processing may be determined as processing concerning creation of a new virtual environment.

Detection of actuation of the virtual environment may also be performed by executing predetermined software at a time of actuation of the virtual environment and notifying the actuation of the virtual environment to the virtual environment actuation detector 108, in the same way as detection of creation of the virtual environment. Further, it is possible to acquire a process ID of the virtual environment in a same way as at a time of detection of execution of software. It is possible to acquire an ID of the virtual environment from information concerning a status of mount owned by the process of the virtual environment, for example. For example, there is a method for creating a virtual environment by mounting execution files of software that is executed in the virtual environment in a route directory of the virtual environment to make the execution files of the software independent. In the method, the process of the virtual environment under execution has information on a mounted target, such as a directory of a mount destination, and a directory to be mounted, and the target of the mount destination may include the ID of the virtual environment, so that it is possible to acquire desired information such as the ID of the virtual environment.

Note that the virtual environment creation detector 110 may create an environment information list when the environment information list does not exist in the storage 101 when the environment information list is tried to be updated. At this time, the virtual environment creation detector 110 may register the path of the host environment into the environment information list.

The check list is used in execution control, and when execution control of software is performed for each virtual environment, it is necessary to register information on the software that is permitted or not permitted in a newly created virtual environment at a time of newly creating the virtual environment. When the virtual environments frequently increase and decrease, an operation of the user properly updating the check list manually is inconvenient. Accordingly, in the present embodiment, a list indicating information that is registered to the check list is prepared, and update of the check list is performed based on the list when creation of a new virtual environment is detected. Hereinafter, the list is described as a pre-registration list. By using the pre-registration list, a burden on operation is reduced. However, the user may input information to be registered to the check list into the information processing apparatus 1, and the check list may register the inputted information to the check list, without using the pre-registration list.

FIG. 5 is a diagram illustrating an example of the pre-registration list. Information to be registered to the check list is registered in the pre-registration list. In the example of FIG. 5, paths and hash values of software in the virtual environments are stored. Note that information in the pre-registration list needs to be registered in advance, but these kinds of information do not depend on the virtual environment, and therefore registration to the pre-registration list can be performed only once to processing such as addition and change of the software. Note that all kinds of information registered in the check list do not have to be registered in the pre-registration list. Information that is not registered in the list in advance but is registered to the allocation list is acquired by the component of the information processing apparatus 1.

Further, the pre-registration list may be divided for use in a white list and for use in a black list. The pre-registration list for a white list includes information on software that is permitted to be executed, and the pre-registration list for a black list may include information on software execution of which is stopped (blocked).

Note that when software that can be permitted or cannot be permitted differs according to the virtual environment, the pre-registration list may include information for distinguishing the virtual environments such as IDs of the virtual environments.

The second path converter 111 converts the path of the software in the virtual environment shown by the pre-registration list into a path in the monitor environment by using the path of the virtual environment acquired by the virtual environment creation detector 110 or the like. The conversion may be the same as the processing of the first path converter 104. For example, when the path of the virtual environment is "/virtual/container1", and the path of the software indicated by the pre-registration list is "/bin/ls", the second path converter 111 creates a path called "/virtual/container1/bin/ls" with these paths being combined as the path of the software in the monitor environment. Thereby, the path of the software in the monitor environment can be registered as in the check list illustrated in FIG. 4.

The second software information acquirer 112 collects information to be registered to the check list, and registers the collected information to the check list. In the example illustrated in FIG. 4, the path of the software in the monitor environment can be acquired via the second path converter 111. A hash value of the software can be acquired from the pre-registration list. As for an inode number in each of the virtual environments of the software, the second software information acquirer 112 can access a layer directory of a mount source, and acquire the inode number of the software.

Strictly speaking, an execution file of the software is mounted at an initial actuation time of a virtual environment. Therefore, until the virtual environment is actuated for the first time, it is impossible to access the execution file of the virtual environment. For example, the execution file does not exist on the path "/virtual/container1/bin/ls" of the software in the monitor environment until the initial actuation time of the virtual environment. Accordingly, when the inode number is acquired by the initial actuation time of the virtual environment, the inode number is acquired by accessing the layer directory of the mount source.

For example, the second software information acquirer 112 that is notified that the path called "/home/virtual/container1/bin/ls" is created by using "/bin/ls" searches for "/bin/ls" in the pre-registration list, and acquires a hash value corresponding to "/bin/ls". Further, when the file path of the layer directory is "/home/virtual/layer1", the second software information acquirer 112 searches for a file of "/bin/ls" under "/home/virtual/layer1", and acquires an inode number from the file. Note that when there are a plurality of layer directories, an inode number may be acquired as described above for each of the layer directories. The second software information acquirer 112 associates "/home/virtual/container1/bin/ls", a hash value corresponding to this, and an inode number corresponding to this with one another.

The check list updater 113 registers information associated by the second software information acquirer 112 to the check list. Note that when the check list does not exist in the storage 101, the check list updater 113 may create a check list. When data exists in the check list, a dataset is added. Note that when a dataset relating to the same software in the same virtual environment is registered in the check list, the dataset can be overwritten.

Note that as described above, when the check list is divided into a plurality of tables or files, the check list updater 113 can detect a table or a file relating to a corresponding virtual environment from the plurality of tables or files by an ordinary method of data search or file search, and perform registration processing to the table or file that is detected.

Figure 6:
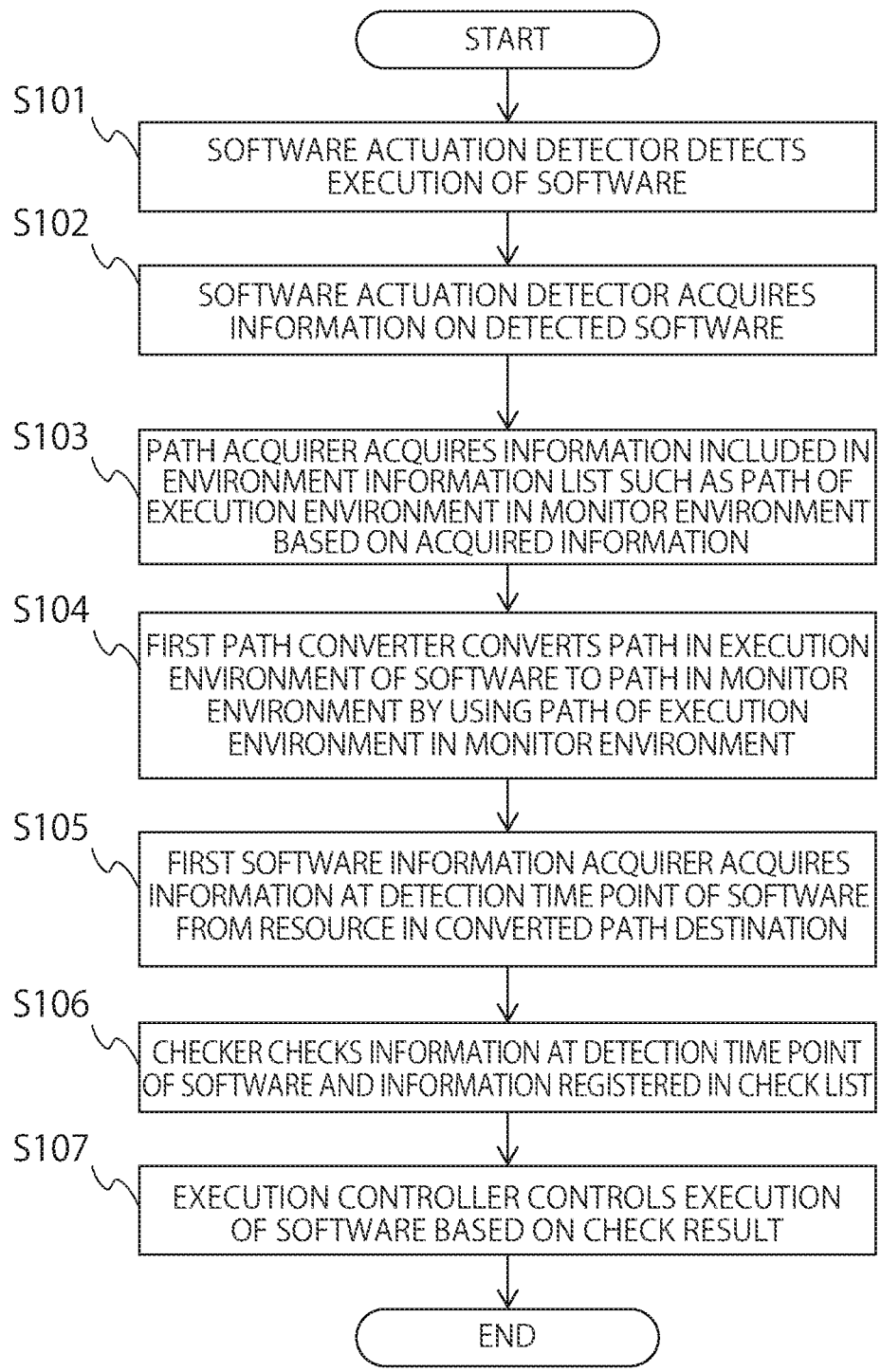
FIG. 6 is a schematic flowchart of processing concerning execution control of software.

Next, a flow of each of processes of the information processing apparatus 1 will be described. FIG. 6 is a schematic flowchart of the processes concerning the execution control of software.

First, the software execution detector 102 detects execution of software by using a function of a hook or the like (S101), and acquires information on the software after suspending the execution of the software (S102). For example, the software execution detector 102 acquires a process ID of the software, a process ID of a virtual environment, an ID of an execution environment of the software and the like.

The path acquirer 103 acquires information included in the environment information list such as a path of the execution environment in the monitor environment, from the environment information list, based on the acquired software information (S103). The first path converter 104 converts the path in the execution environment of the software into a path in the monitor environment by using the path of the execution environment in the monitor environment (S104). Note that when the execution environment of the software is the monitor environment, it is possible to access the file of the software by using the path without converting the path, and therefore processes in S103 and S104 may be skipped.

The first software information acquirer 105 acquires information at the detection time point of the software from a resource existing in the converted path destination to check the information with the check list (S105). Note that the information already acquired such as the process ID of the software does not have to be acquired. A file itself that is the resource may be copied, and the information may be acquired from the copied file.

The checker 106 checks the information at the detection time point of the software, which is acquired in the processes up to this time against the information of the software registered in the check list (S106). The execution controller 107 determines whether it is possible or not to execute the software based on a check result and performs control (S107). For example, when the software is determined as legitimate software, execution of the suspended software is permitted, and when the software is determined as illegitimate software, the software may be stopped. When the software is stopped, a program configured to output a warning message may be executed. Execution control is performed in this way, and the present flow ends.

Figure 7:
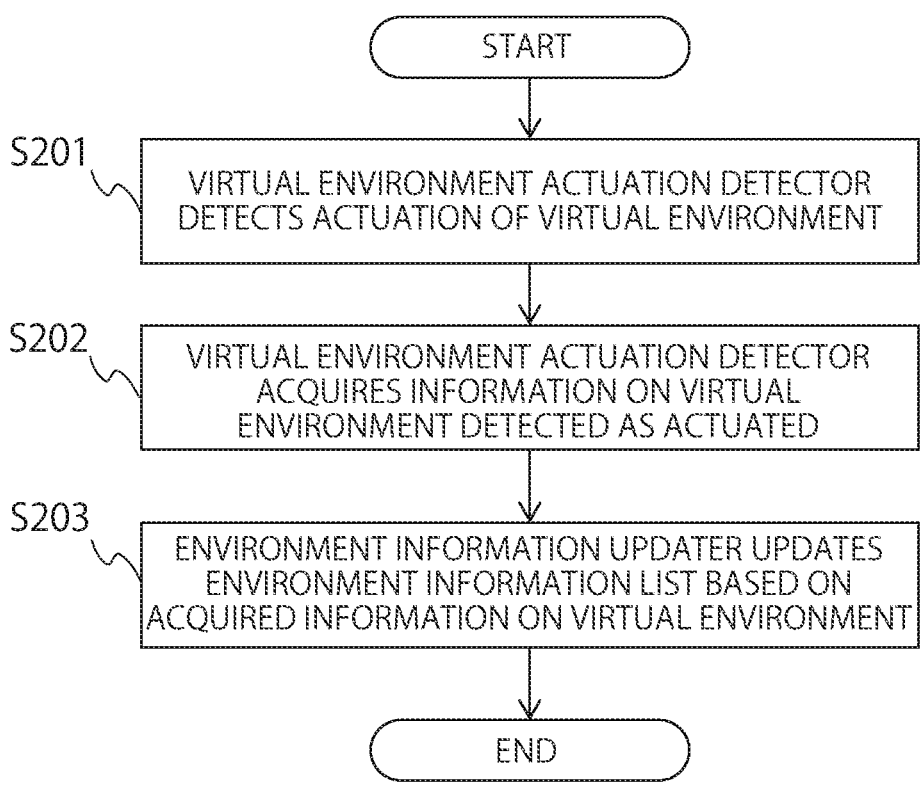
FIG. 7 is a schematic flowchart of processing at a time of detection of virtual environment actuation.

FIG. 7 is a schematic flowchart of processing at a detection time of virtual environment actuation. The virtual environment actuation detector 108 detects actuation of a virtual environment (S201), and acquires information on the actuated virtual environment such as the ID and process ID of the virtual environment (S202). For example, the virtual environment actuation detector 108 may detect a system call concerning mount processing that is executed when the virtual environment is actuated, consider that the virtual environment is actuated, and acquire the information on the virtual environment from arguments included in the system call.

The environment information list updater 109 registers the information on the actuated virtual environment to the environment information list in the storage 101 with associating the information (S203). When the information on the virtual environment is already registered at the time of creation of the virtual environment as described above, unregistered information such as the process ID is added. Thereby, the information of the actuated virtual environment is updated to the latest information. This is the end of this flow.

Figure 8:
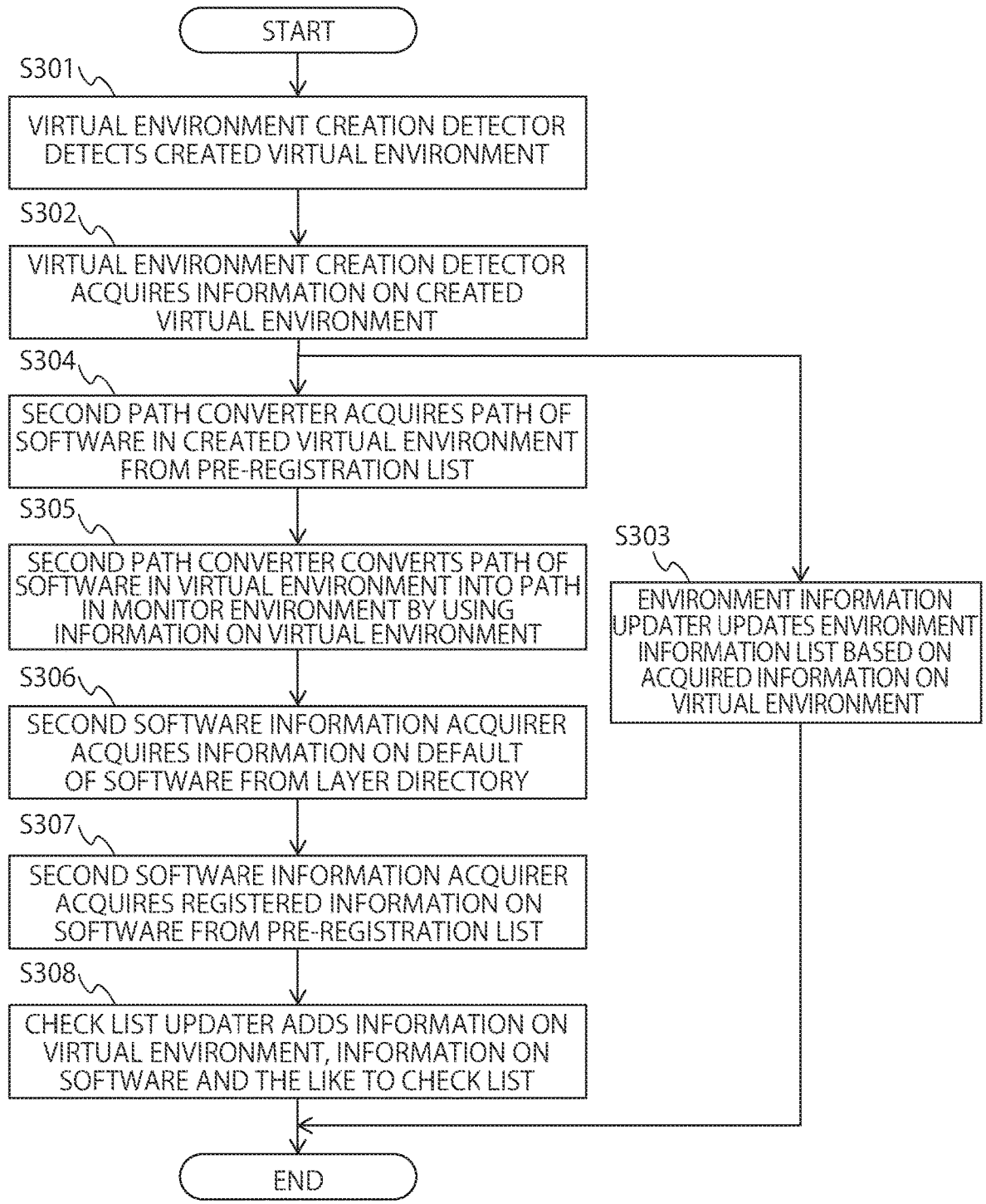
FIG. 8 is a schematic flowchart of processing at a time of detection of virtual environment creation in the first embodiment.

FIG. 8 is a schematic flowchart of processing at a time of detection of virtual environment creation in the first embodiment. The virtual environment creation detector 110 detects virtual environment creation by hooking a system call or the like for executing mount processing (S301), and acquires information on a virtual environment to be created, such as an ID of the virtual environment, a path of the virtual environment, and a layer directory (S302).

The environment information list updater 109 registers these kinds of information acquired to the environment information list information in the storage 101, as one dataset (S303). The dataset of the same virtual environment may already exist, but in that case, the dataset is considered as previous old information, and is overwritten, because problems occur when multiple datasets exit.

The second path converter 111 acquires a path of the software in the created virtual environment from the pre-registration list (S304). Subsequently, the second path converter 111 converts the path of the software in the virtual environment into a path in the monitor environment by using the path of the virtual environment (S305).

The second software information acquirer 112 accesses the acquired layer directory of the software, and acquires information on an initial state (default) of the software such as an inode number from a resource in the layer directory (S306). Note that when a plurality of layer directories exist, the second software information acquirer 112 can access the directories in order, and when the second software information acquirer 112 cannot acquire all kinds of desired information, the second software information acquirer 112 can proceed to the next layer directory. Note that when desired information such as a hash value cannot be acquired, the second software information acquirer 112 may create the information based on the information on the resource in the layer directory. Further, the second software information acquirer 112 acquires software recorded in the pre-registration list, and the information on the software such as a hash value (S307).

The check list updater 113 registers information on the virtual environment and software such as the ID of the virtual environment, the path, the hash value, and information on default in the execution environment of the software to the check list (S308). In this way, the present flow ends. Thereby, every time a virtual environment is created, the check list automatically includes information in the virtual environment.

Note that in the above, the software execution detector 102 and the virtual environment actuation detector 108 are separately described, but since the virtual environment is also a kind of software, the software execution detector 102 may also serve as the virtual environment actuation detector 108. In that case, for example, the software execution detector 102 performs detection of the software including the virtual environment, and confirms whether a parent process of the detected software is software that manages the virtual environment. A confirmation method can be such that information on the software that manages the virtual environment (a name of the software, an ID of a process and the like) is investigated, and information on the software managing the virtual environment matches the investigated information. When the information matches the investigated information, the detected software is determined to be software (software to be a process of the virtual environment executed) for actuating the virtual environment, and the above described processing at the detection time of virtual environment actuation can be executed. When the information does not match the investigated information, processing concerning execution control of the software can be executed.

As above, the information processing apparatus 1 of the present embodiment can convert the path in the execution environment of the software into the path in the monitor environment even when the execution environment of the detected software and the monitor environment of the software differ from each other. Accordingly, it is possible to access the resource of the software from the monitor environment, and acquire information at the detection time point of the software. It is possible to detect falsification of the software by comparing the information at the detection time point of the software, and the registered information on the software.

Second Embodiment

Figure 9:
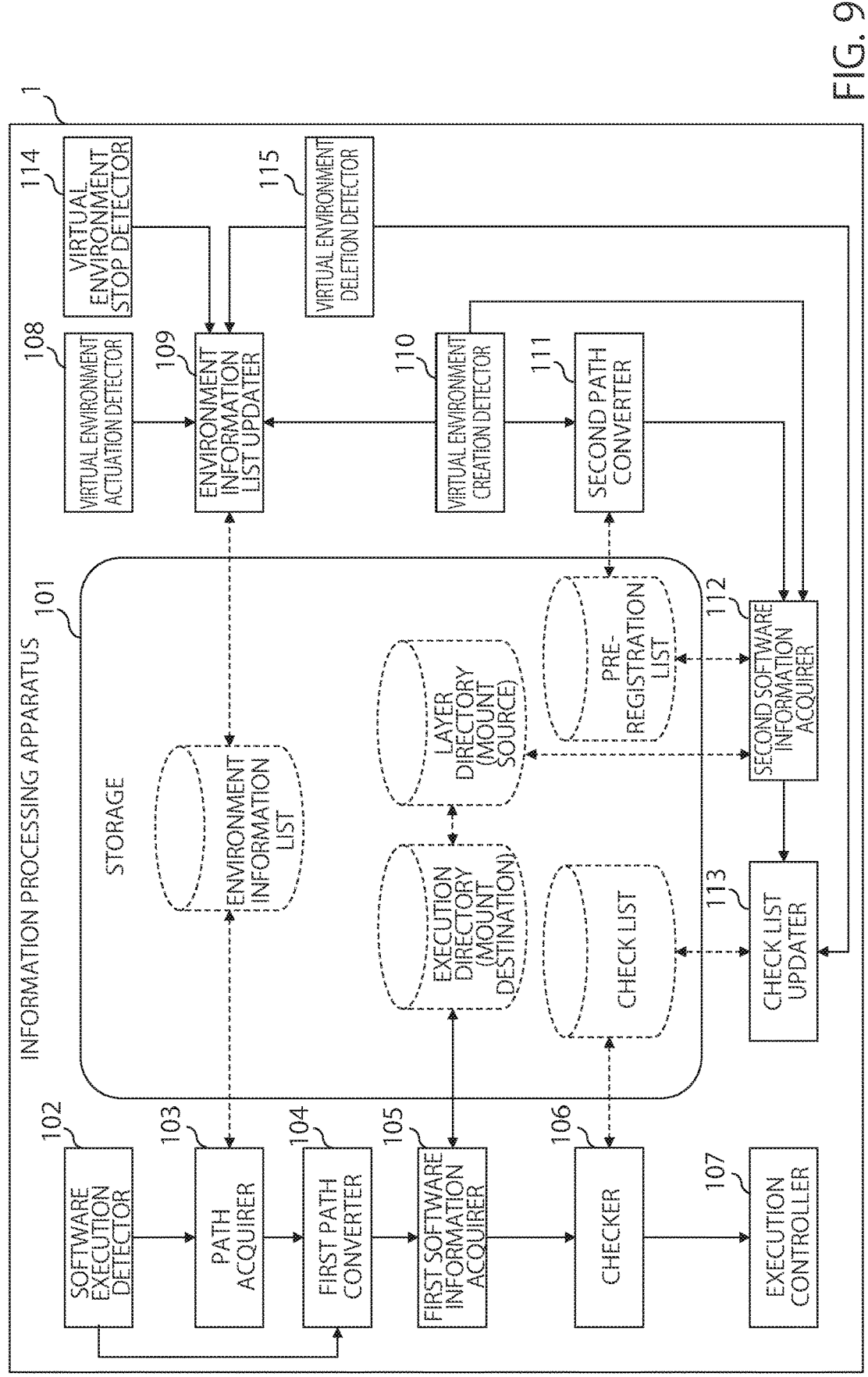
FIG. 9 is a block diagram illustrating an example of an information processing apparatus relating to a second embodiment.

FIG. 9 is a block diagram illustrating an example of the information processing apparatus 1 concerning a second embodiment. In the present embodiment, a virtual environment stop detector 114 configured to detect stop of a virtual environment, and a virtual environment deletion detector 115 configured to detect deletion of the virtual environment are further included. Description of the same matters as those of the first embodiment will be omitted.

In the first embodiment, the environment information list updater 109 updates the environment information list at the time of creation and actuation of the virtual environment. In the present embodiment, an environment information list updater 109 also updates an environment information list and a check list when detecting stop and deletion of a virtual environment.

Since the value of a process ID is reused, a value that was used as a process ID of a virtual environment before can be assigned as a process ID of different software. For example, an ID of a parent process of detected software is considered to have been a process ID of a virtual environment that existed in the past but is currently deleted. In that case, the detected software is likely to be erroneously determined as being executed in the virtual environment that is actually deleted. Thereby, there is a fear that erroneous execution control of the software is performed. Accordingly, update of the environment information list and the check list is performed when the virtual environment is stopped or deleted. Thereby, enlargement of the environment information list and the check list can be prevented.

The environment information list updater 109 updates information on the virtual environment that is detected as stopping by the virtual environment stop detector 114 in the environment information list. The environment information list updater 109 may acquire the information on the stopped virtual environment from the virtual environment stop detector 114, and may replace the information in the environment information list with the acquired information. Alternatively, the environment information list updater 109 may update the information on the stopped virtual environment in the environment information list to a value indicating that the virtual environment is stopped. Alternatively, the environment information list updater 109 may change a value of an item indicating whether the information is usable to a value indicating that the information is unusable.

For example, in the environment information list illustrated in FIG. 2, a process ID of the virtual environment is updated when the virtual environment is stopped. The process ID of the stopped virtual environment may be deleted and left blank, or may be replaced with a numeric value that is never assigned as the process ID. For example, the process ID may be replaced with an invalid numeric value such as "−1".

For example, an item by which it is determined whether the virtual environment is in an actuated state or a stopped state is added to the environment information list, though not illustrated in FIG. 2, and a value of the item may be updated according to a detected state of the virtual environment. A path acquirer 103 may determine whether each dataset in the environment information list is valid by referring to the value of the item, when reading the environment information list.

The environment information list updater 109 updates information in the environment information list, the information being detected as being deleted by the virtual environment deletion detector 115 on the virtual environment. The environment information list updater 109 may leave the information on the deleted virtual environment in the environment information list blank. Alternatively, the environment information list updater 109 deletes the entire dataset relating to the virtual environment, and datasets existing below the deleted dataset may be moved upward. Alternatively, the deleted dataset may be rewritten to predetermined information indicating that the dataset is deleted. Alternatively, a value of the item indicating whether the information is useable may be changed to a value indicating that the information is unusable.

A check list updater 113 may update information on the virtual environment detected as stopped or deleted in a check list in the same way as the environment information list updater 109.

The virtual environment stop detector 114 detects stop of a virtual environment. The virtual environment deletion detector 115 detects deletion of a virtual environment. Stop and deletion of a virtual environment may be detected by using a hook or the like in the same way as actuation and creation of the virtual environment. For example, when a virtual environment is actuated or created, virtual environment management software may create a directory of a name partially including a name of the virtual environment, and delete the directory when the virtual environment is stopped or deleted. By using this, a system call relating to deletion of a directory may be detected by using a hook to acquire information on the system call, and stop and deletion of the virtual environment may be detected based on a path of the directory which is deleted. For example, when the management software manages a directory called "/virtual/moving/", and creates a directory relating to an actuated virtual environment under the directory, a virtual environment called "container1" may be considered as stopped when a directory called "/virtual/moving/container1" is deleted. Alternatively, a directory created when actuation of the virtual environment is detected is stored by being associated with the virtual environment, and when the directory is deleted, the virtual environment may be considered as deleted.

The stopped virtual environment may be identified from a disappeared process ID. Alternatively, the stopped virtual environment may be identified based on a trace of processing that is executed in stop or deletion of the virtual environment.

Figure 10:
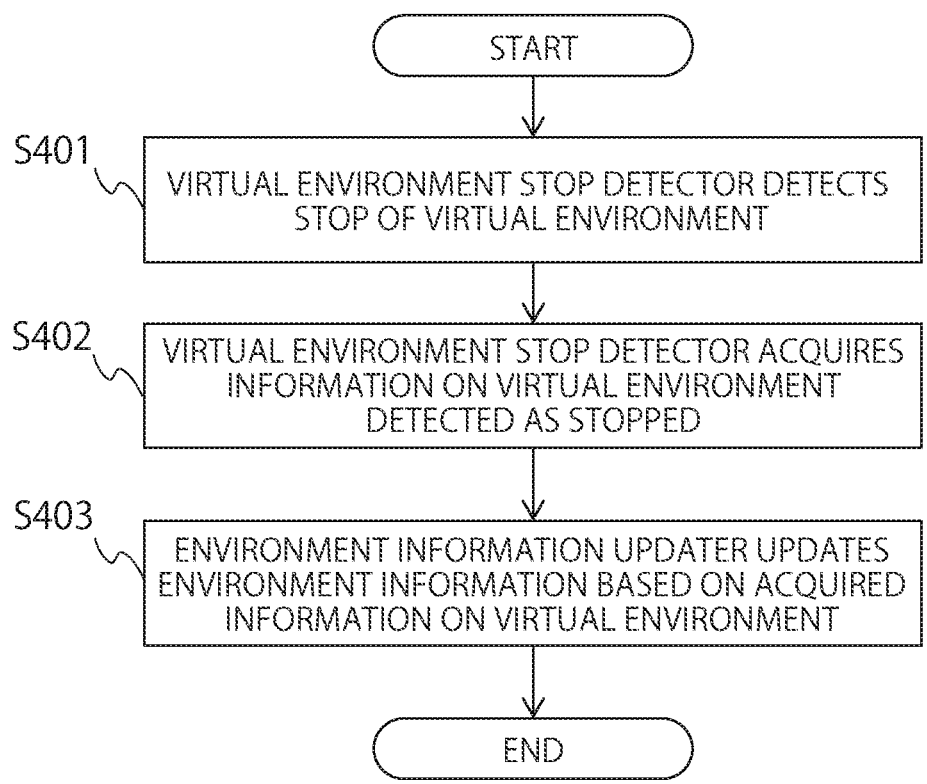
FIG. 10 is a schematic flowchart of processing at a time of detection of virtual environment stop.

FIG. 10 is a schematic flowchart of processing at a time of detection of virtual environment stop. An example of a flow from stop of a virtual environment to update of the environment information list will be described. The virtual environment stop detector 114 detects stop of the virtual environment by using a hook or the like (S401), and acquires information on the virtual environment that is detected as stopped (S402). The environment information list updater 109 updates the environment information list based on the acquired information on the virtual environment (S403). Note that the virtual environment stop detector 114 may recognize information that is changed by stop of the virtual environment such as a process ID, and may acquire only the information to notify the information to the environment information list updater 109, or the environment information list updater 109 may recognize the information and update only necessary information from the information acquired by the virtual environment stop detector 114.

Figure 11:
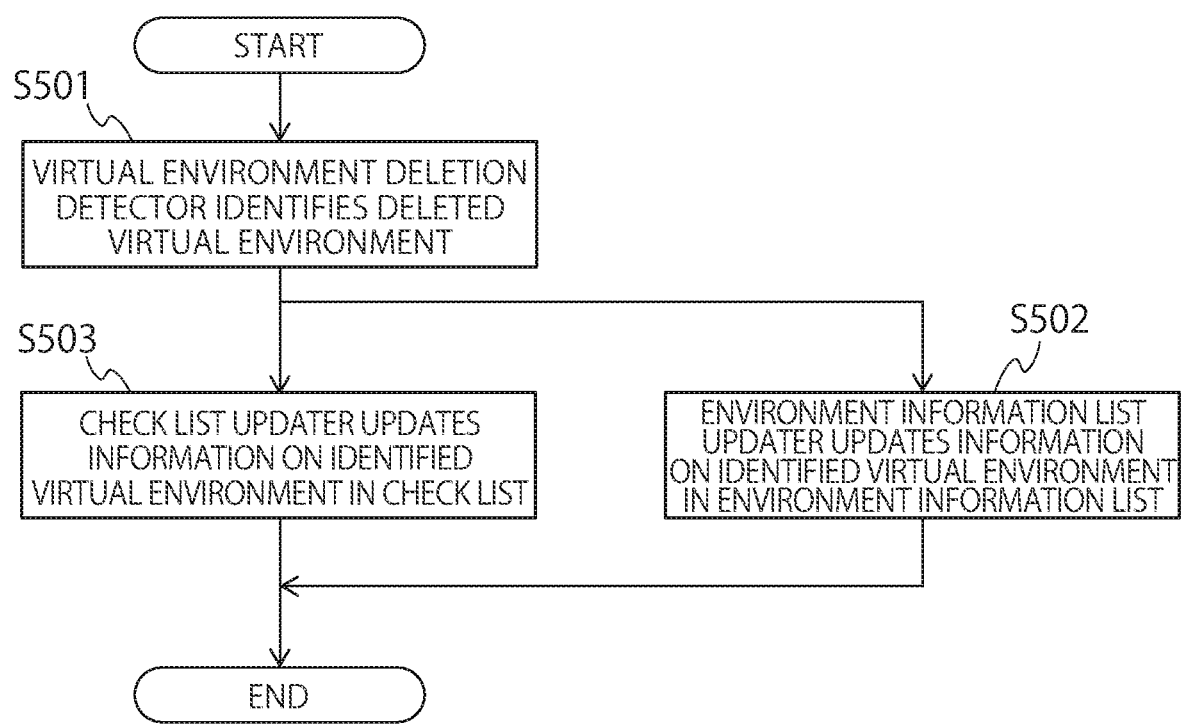
FIG. 11 is a schematic flowchart of processing at a time of detection of virtual environment deletion.

FIG. 11 is a schematic flowchart of processing at a time of detection of virtual environment deletion. The virtual environment deletion 115 detector detects processing concerning deletion of a virtual environment by using a hook or the like to identify the deleted virtual environment (S501). The environment information list updater 109 deletes information concerning the identified virtual environment in the environment information list (S502). The check list updater 113 deletes information on the identified virtual environment in the check list (S503). In this way, unnecessary information is deleted from the environment information list and the check list.

Third Embodiment

Figure 12:
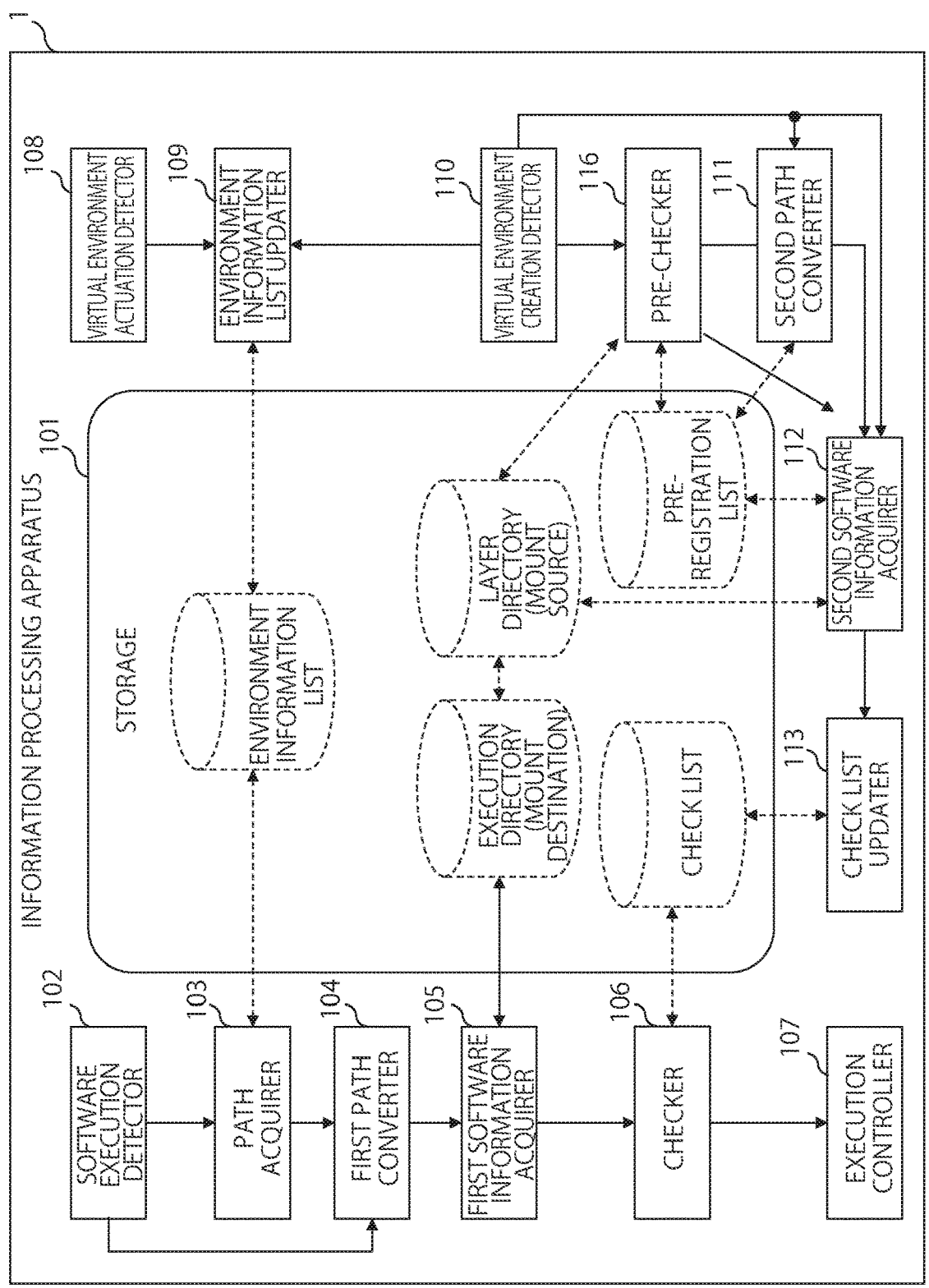
FIG. 12 is a block diagram illustrating an example of an information processing apparatus relating to a third embodiment.

FIG. 12 is a block diagram illustrating an example of an information processing apparatus 1 according to a third embodiment. In the present embodiment, a pre-checker (second checker) 116 is further included, with respect to the foregoing embodiments. Description of the same matters as those of the foregoing embodiments will be omitted.

The pre-checker 116 checks information on software in a layer directory against information in a pre-registration list.

In other words, the pre-checker 116 confirms whether either one of the layer directory and the pre-registration list is falsified. The check is described as pre-check to be distinguished from check using a check list.

When a path of the layer directory is known, timing for execution of pre-check may be properly set. The pre-checker 116 acquires a path of software in the layer directory from the pre-registration list, and creates a path of the software in a monitor environment by using a path in the layer directory in the monitor environment, in the same way as a second path converter 111. Information on the software of the layer directory may be acquired by using the path. For example, a hash value may be created from the information on the software, for example. In other words, the hash value of the software in the layer directory may be acquired. When the path of the layer directory is not known, pre-check is executed after the path of the layer directory is acquired by a virtual environment actuation detector 108. In that case, the pre-checker 116 may acquire the path of the software in the layer directory from the second path converter 111.

Note that pre-check may be performed for only specified software instead of all kinds of software registered in the pre-registration list. For example, it is possible that in the example in FIG. 5, pre-check is performed for software called "/bin/ls" and "bin/bash", but pre-check is not performed for software called "/bin/cat".

When a plurality of layer directories exist, the pre-checker 116 may access all of the plurality of layer directories, and may acquire information of each of the layer directories.

A second software information acquirer 112 changes information to be acquired based on a result of pre-check. For example, when the check list is used as a white list, the second software information acquirer 112 does not acquire information on software to prevent the software having information determined as not matching by pre-check from being registered to the check list. On the other hand, when the check list is used as a black list, the second software information acquirer 112 acquires the information on the software having the information determined as not matching by pre-check. It is not necessary to acquire the information already acquired by the pre-checker 116 again from the software in the layer directory. In this way, only the information that should be registered to the check list by the check list updater 113 can be acquired, and the check list updater 113 can register the information acquired by the second software information acquirer 112 to the check list.

Note that among a plurality of layer directories, mounting of a layer directory having information that does not match the pre-registration list may be prohibited. When the corresponding software cannot be found even when search processing is performed for all the layer directories, a file path of software that is a next search target is acquired from the pre-registration list, and the flow proceeds to acquisition and check processing of a hash value again. The aforementioned search processing and check processing are performed for all kinds of software in the pre-registration list, check results of the respective kinds of software are acquired, and are summarized in information with which software in the pre-registration succeeding in check can be discriminated.

Figure 13:
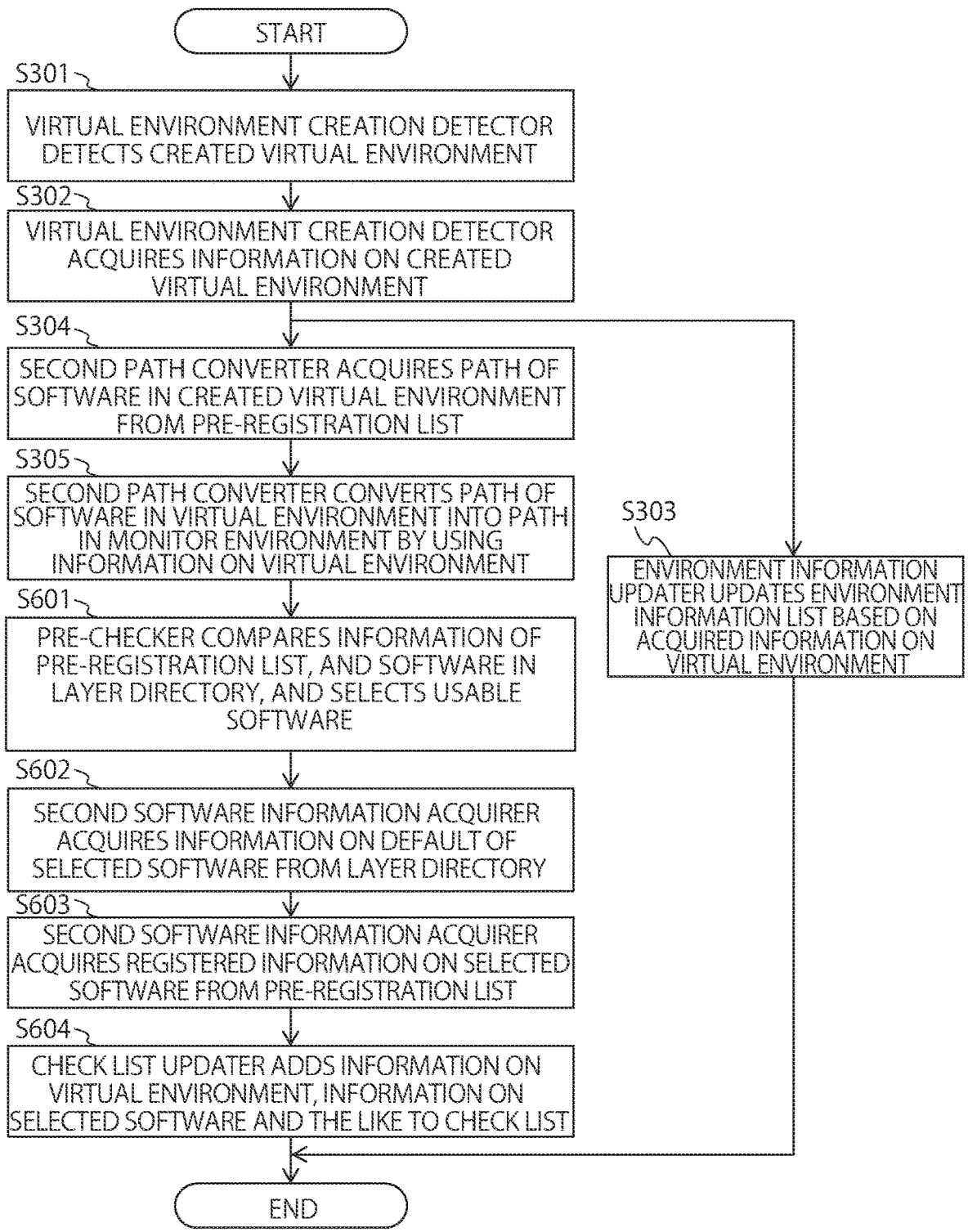
FIG. 13 is a schematic flowchart of processing at a time of detection of virtual environment creation in the third embodiment.

FIG. 13 is a schematic flowchart of processing at a detection time of virtual environment creation in the third embodiment. The present flowchart differs in processes in S305 and the following steps as compared with the flowchart of the first embodiment.

The pre-checker 116 acquires information on software in a layer directory by using a path in a virtual environment created by the process in S305, compares the information with information in the pre-registration list, and selects usable or unusable software (S601). Subsequently, the second software information acquirer 112 acquires information on a default of the selected software from the layer directory (S602). Further, the second software information acquirer 112 acquires information on the selected software of the information registered in the pre-registration list (S603). The check list updater 113 adds the information on the virtual environment, the information on the selected software and the like that are acquired by the second software information acquirer 112 to the check list (S604). In this way, the information on the software determined as usable or unusable by pre-check is registered to the check list.

Fourth Embodiment

Created virtual environments do not have to be the same. Various virtual environments may be created. The virtual environment can be created by mounting a layer directory as described above. Accordingly, a plurality of image files with different layer directories including them are created, and various kinds of virtual environments can be created by using the different image files.

For example, an image file may be prepared for each kind of OS used in the virtual environment, and at a time of creation of the virtual environment, an image file corresponding to a specified OS may be selected, and the virtual environment may be created. Peculiar IDs (hereinafter, called image IDs) to the image files are assigned to the image files, and can be managed by software or the like configured to manage the virtual environment.

In the present embodiment, processing using the information concerning image files is performed when the virtual environment image files created in this way differ. For example, when a virtual environment "container1" created by a user A can be used by two kinds of virtual environments differing in OS, it is likely to occur that creation by using image files A and B is permitted, but creation by using an image file C is not permitted, to the virtual environment "container 1". In that case, whether the image file that is the basis of the virtual environment is permitted may be confirmed at the time of check. Further, permitted software may differ according to the image file. In that case, the detected software may be executed and controlled based on the image file that is the basis of an execution environment.

Figure 14:
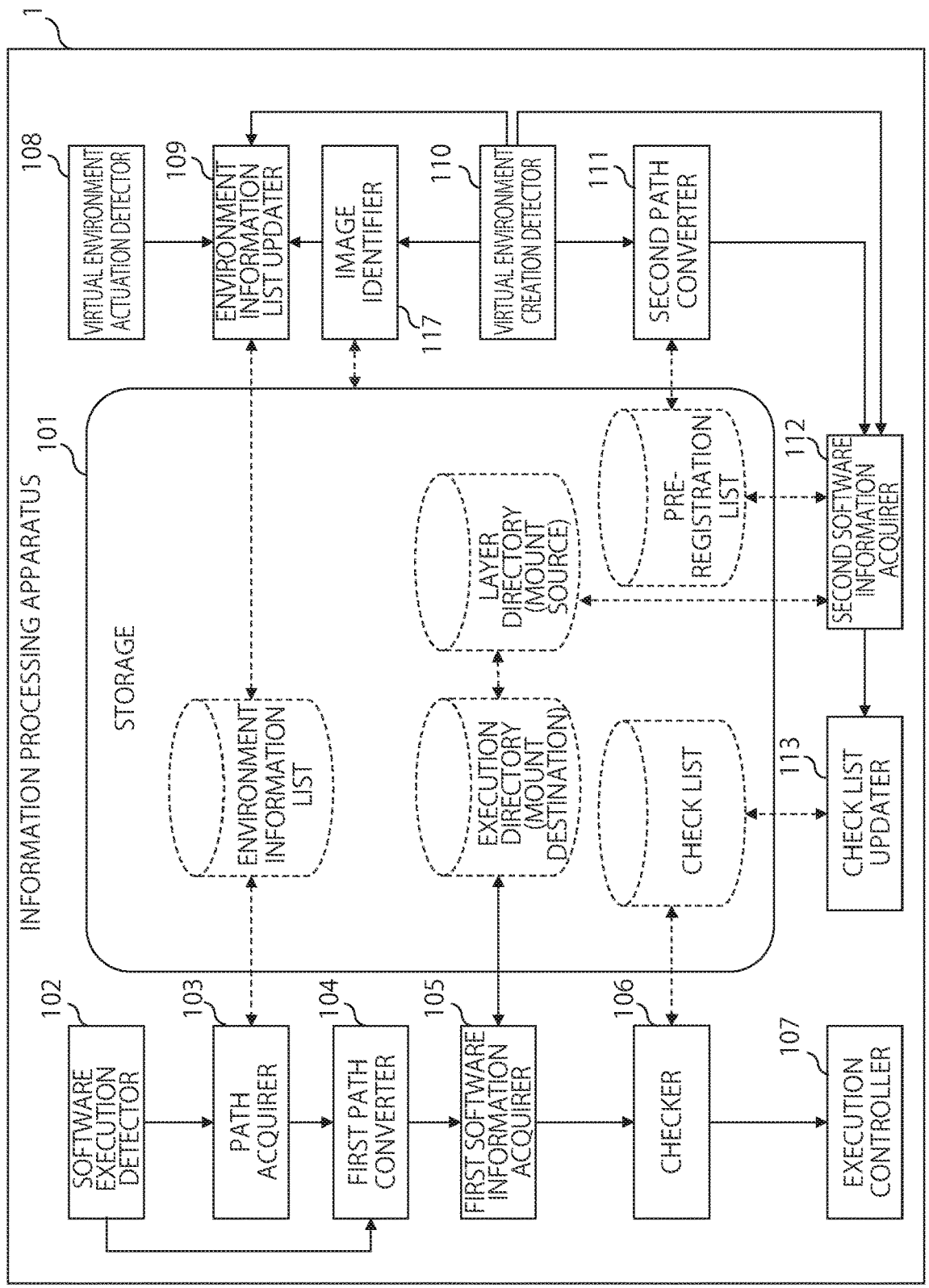
FIG. 14 is a block diagram illustrating an example of an information processing apparatus relating to a fourth embodiment.

FIG. 14 is a block diagram illustrating an example of the information processing apparatus 1 relating to a fourth embodiment. In the present embodiment, an image file identifier 117 is further included. Description of the same matters as those of the foregoing embodiments will be omitted.

The image file identifier 117 acquires an ID of an image file used in creation of a virtual environment based on an ID of the created virtual environment. For example, the image file identifier 117 may access a file managed by management software of the virtual environment, and search for information such as the ID of the image file used in creation of the virtual environment, and a path of a layer directory from the file, with the ID of the created virtual environment as a key.

An environment information list updater 109 may also register an ID of an image file identified by the image file identifier 117 to an environment information list.

In a pre-registration list, an image file that may be used in creation of the virtual environment or an image file that should not be used in creation of the virtual environment may be registered. Alternatively, software that is permitted or software that is not permitted may be specified for each image file. A check list updated based on the pre-registration list includes these kinds of information. Note that as described above, these kinds of information may be inputted to the information processing apparatus 1, and the check list may have these kinds of information registered, without using the pre-registration list.

A path acquirer 103 acquires information included in the environment information list as described above, and can also acquire the ID of the image file of the virtual environment since the ID of the image file specified is also included in the environment information list.

A first software information acquirer 105 may acquire information concerning the image file when acquiring information at a detection time point of the detected software from the resource existing in the path in a monitor environment of the detected software.

The checker 106 may perform check by also using an ID of an image file that is the basis of the execution environment. As described above, since the check list also includes the ID of the image file, it is also checked whether or not the IDs of the image files match each other. When the IDs of the image files match, execution of the software is determined to be permitted or unpermitted by the execution controller 107.

Figure 15:
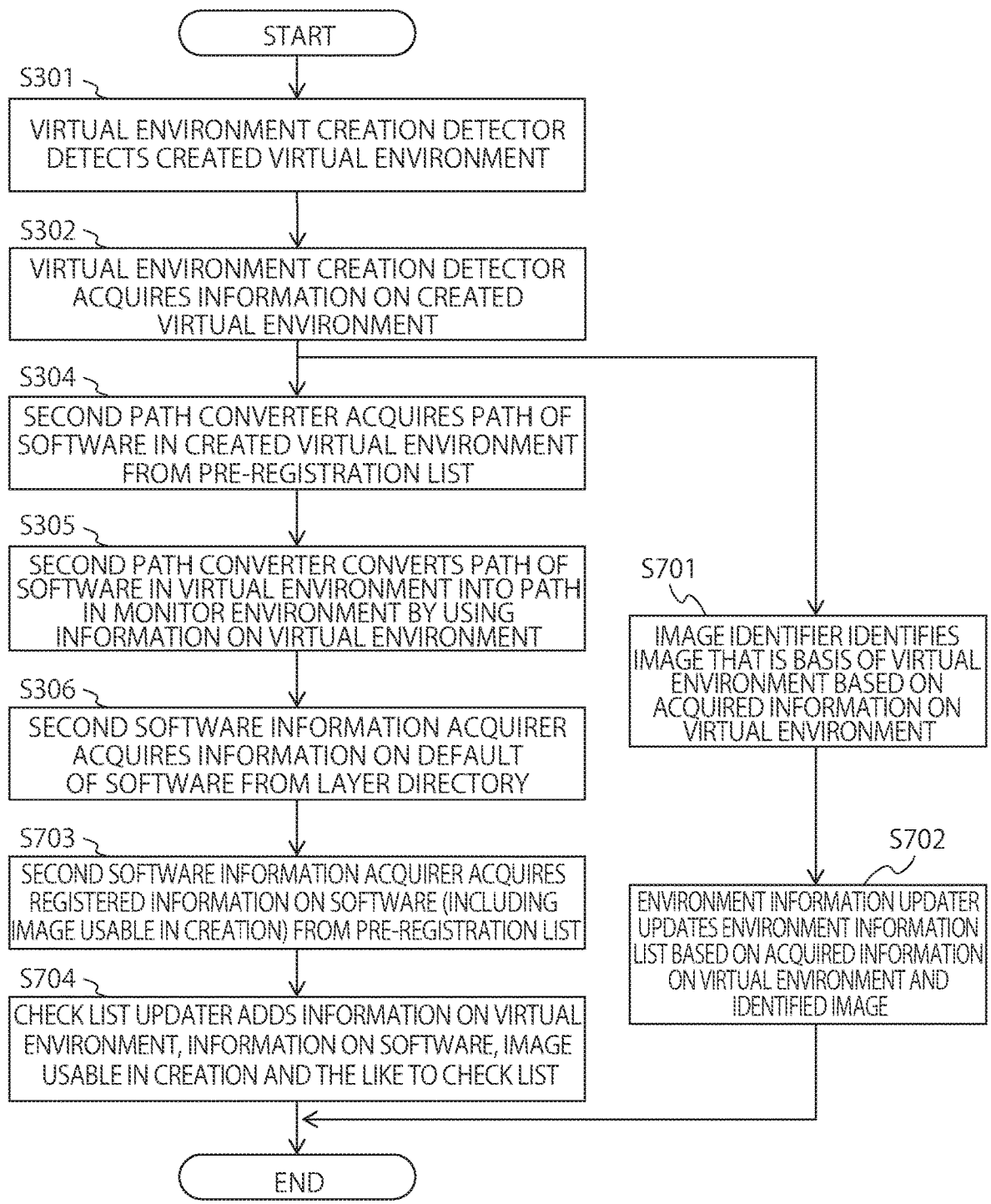
FIG. 15 is a schematic flowchart of processing at a time of detection of virtual environment creation in the fourth embodiment.

FIG. 15 is a schematic flowchart of processing at a detection time point of virtual environment creation in the fourth embodiment. To the present flow, a process in S701 is added as compared with that in the first embodiment. Further, since the image ID is registered, the processes in S303, S307, and S308 in the flow of the first embodiment are changed to processes in S702, S703, and S704 respectively in the present flow.

Information on a created virtual environment is acquired by the process in S302, and the image file identifier 117 identifies an image file that is a basis of the virtual environment by using the information on the virtual environment (S701). The environment information list updater 109 registers information on the specified image file to the environment information list with the other information on the virtual environment (S702).

The second software information acquirer 112 acquires the registered information on the software from the pre-registration list as in the foregoing embodiments, and the information also includes the image files that may be used in creation of the virtual environment. Further, the check list updater 113 also adds information indicating the image files that may be used in creation of the virtual environment to the check list with the information on the virtual environment, the information on the software and the like (S703). In this way, the virtual environments and the image files are stored in the environment information list by being associated with one another.

In the execution control of software, the information on the image files is included in the information that is acquired and checked, and a flow of processing is the same as that in the first embodiment, and therefore a schematic flowchart of the processing concerning the execution control of the software of the present embodiment will be omitted. Since the information indicating the image files is included in at least the environment information list and the check list, it can be confirmed whether the image files match with each other in check in the checker 106. Thereby, execution control of each image file used in creation becomes possible.

Note that at least part of the above described embodiments may be realized by a dedicated electronic circuit (that is, hardware) such as an IC (Integrated Circuit) in which a processor, a memory and the like are packaged. Further, at least part of the above described embodiments may be realized by executing software (program). For example, it is possible to realize the processing of the above described embodiments by using a general-purpose computer device as basic hardware, and causing a processor such as a CPU mounted on the computer device to execute the program.

For example, it is possible to use a computer as the device of the above described embodiments by the computer reading the dedicated software stored in a computer-readable storage medium. A kind of the storage medium is not specially limited. It is possible to use a computer as the device of the above described embodiments by the computer installing dedicated software downloaded via a communication network. In this way, information processing by the software is specifically implemented by using hardware resources.

Figure 16:
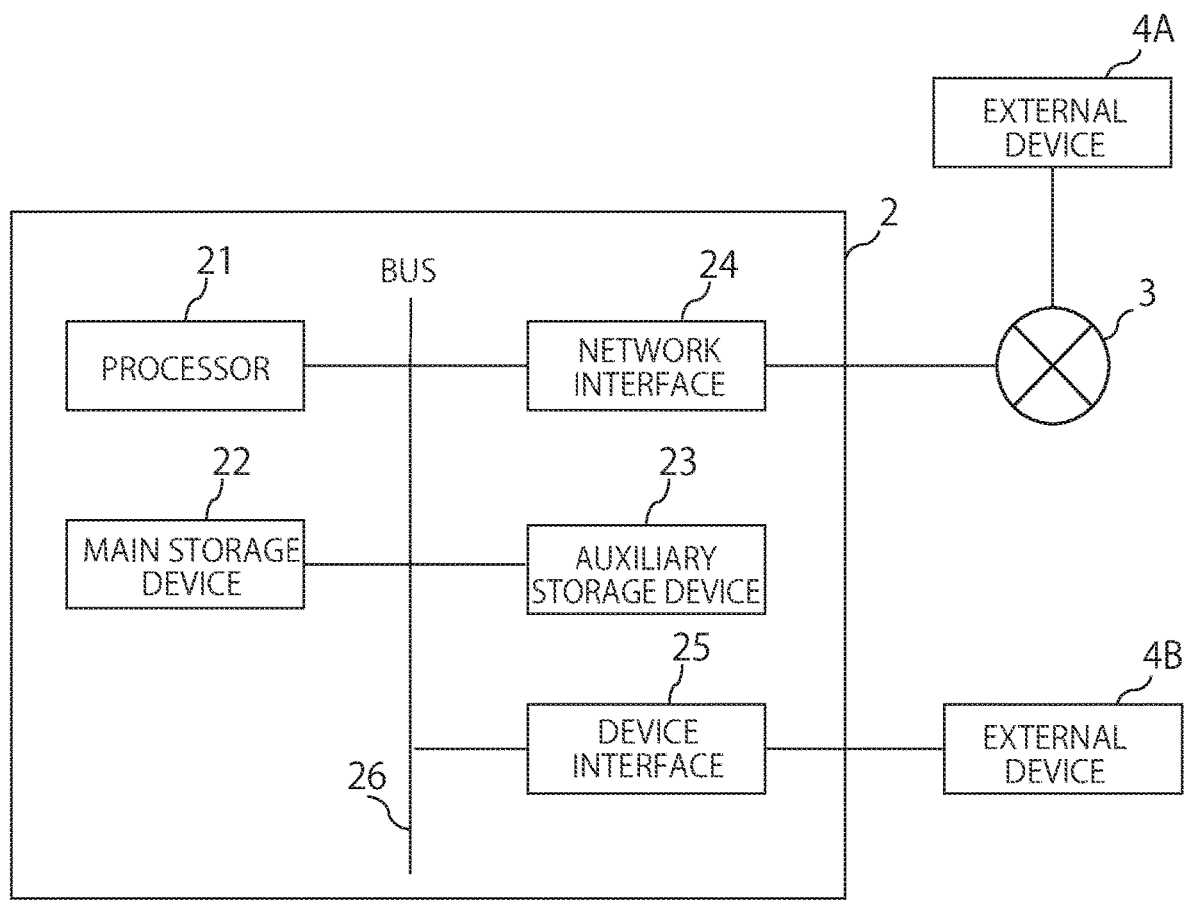
FIG. 16 is a block diagram illustrating an example of a hardware configuration in one embodiment of the present invention.

FIG. 16 is a block diagram illustrating an example of a hardware configuration in one embodiment of the present invention. The information processing apparatus 1 can be realized as a computer device 2 including a processor 21, a main storage device 22, an auxiliary storage device 23, a network interface 24, and a device interface 25, with these components connected via a bus 26. The storage 101 can be realized by the main storage device 22 or the auxiliary storage device 23, and the components other than the storage 101 such as the software execution detector 102 can be realized by the processor 21.

Note that the computer device 2 in FIG. 16 includes one of each of the respective components, but may include a plurality of same components. Further, FIG. 16 illustrates the single computer device 2, but software may be installed in a plurality of computer devices and the plurality of computer devices may respectively execute different parts of processing of the software.

The processor 21 is an electronic circuit including a control device and an arithmetic operation device of the computer. The processor 21 performs arithmetic operation processing based on data and a program inputted from respective devices of an internal configuration of the computer device 2, and outputs arithmetic operation results and control signals to the respective devices and the like. Specifically, the processor 21 executes an OS (operating system) of the computer device 2, applications and the like, and controls the respective devices configuring the computer device 2. The processor 21 is not specially limited as long as the processor 21 can perform the above described processing.

The main storage device 22 is a storage device configured to store a command executed by the processor 21, various data and the like, and information stored in the main storage device 22 is directly read out by the processor 21. The auxiliary storage device 23 is a storage device other than the main storage device 22. Note that these storage devices mean arbitrary electronic components capable of storing electronic information, and may be memories or storages. Further, as the memories, there are volatile memories and nonvolatile memories, but the memories may be either one of them.

The network interface 24 is an interface to connect to the communication network 3 wirelessly or by wire. As the network interface 24, a network interface that is adapted to existing communication standards can be used. By the network interface 24, exchange of information may be performed with an external device 4A communicably connected via the communication network 3.

The device interface 25 is an interface such as a USB that directly connects to an external device 4B. The external device 4B may be an external storage medium, or a storage device such as a database.

The external devices 4A and 4B may be output devices. The output devices are, for example, display devices for displaying images, or may be devices that output sound or the like. For example, there are an LCD (Liquid Crystal Display), CRT (Cathode Ray Tube), a PDP (Plasma, Display Panel), a speaker and the like, but the output device is not limited to them.

Note that the external devices 4A and 4B may be input devices. The input devices each includes devices such as a keyboard, a mouse, and a touch panel, and gives information inputted by these devices to the computer device 2. Signals from the input devices are outputted to the processor 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus capable of providing a host environment, and one or more virtual environments, comprising:
   a software execution detector configured to detect execution of first software in any of the host environment, and the one or more virtual environments, and acquire discrimination information indicating that an environment where the first software is detected is a first environment, and first name information indicating a name of the first software in a name space of the first environment;
   a name information acquirer configured to acquire second name information indicating a name of the first environment in a name space of a second environment different from the first environment, based on the discrimination information;
   a converter configured to convert the first name information into third name information indicating a name of the first software in the name space of the second environment, based on the second name information; and
   a software information acquirer configured to acquire information on the first software from an accessible resource, based on the third name information.

2. The information processing apparatus according to claim 1, further comprising:
   a first checker configured to check whether the acquired information on the first software matches information registered in a first list; and
   an execution controller configured to control execution of the first software, based on a result of the check.

3. The information processing apparatus according to claim 2,
   wherein the name information acquirer acquires the second name information from the discrimination information, based on a second list where the discrimination information and the second name information are associated with each other.

4. The information processing apparatus according to claim 3, further comprising:
   a virtual environment creation detector configured to detect creation of the first environment, the first environment being a virtual environment, and acquire the discrimination information and the second name information; and
   a second list updater configured to register the discrimination information and the second name information to the second list by associating the discrimination information and the second name information.

5. The information processing apparatus according to claim 3, further comprising:
   a virtual environment actuation detector configured to detect actuation of the first environment, the first environment being a virtual environment, and acquire the discrimination information, and a process ID of the first environment; and
   a second list updater configured to add the process ID of the first environment to a dataset concerning the discrimination information of the second list.

6. The information processing apparatus according to claim 4, further comprising:
   a virtual environment creation detector configured to detect actuation of the first environment, and acquire the discrimination information, and a process ID of the first environment,
   wherein the second list updater adds the process ID of the first environment to a dataset concerning the discrimination information of the second list.

7. The information processing apparatus according to claim 2, further comprising:
   a virtual environment creation detector configured to detect creation of the first environment, the first environment being a virtual environment, and acquire fourth name information indicating a name in the name space of the second environment of a directory storing an original file of the first software;
   a second converter configured to convert the first name information into fifth name information indicating a name of the original file in the name space of the second environment, based on the fourth name information;
   a second software information acquirer configured to acquire the information on the first software from the original file, based on the fifth name information; and
   a first list updater configured to register the information on the first software acquired from the original file to the first list.

8. The information processing apparatus according to claim 4,
   wherein the virtual environment creation detector further acquires fourth name information indicating a name in the name space of the second environment, of a directory storing an original file of the first software, the information processing apparatus further comprising:
- a second converter configured to convert the first name information into fifth name information indicating a name of the original file in the name space of the second environment, based on the fourth name information;
- a second software information acquirer configured to acquire the information on the first software from the original file, based on the fifth name information; and
- a first list updater configured to register the information on the first software acquired from the original file to the first list.

9. The information processing apparatus according to claim 4, further comprising:
- a virtual environment stop detector configured to detect stop of the first environment, and acquire the discrimination information,
- wherein the second list updater updates information concerning the first environment in the second list.

10. The information processing apparatus according to claim 4, further comprising:
- a virtual environment deletion detector configured to detect deletion of the first environment, and acquire the discrimination information,
- wherein the second list updater updates information concerning the first environment in the second list when deletion of the first environment is detected.

11. The information processing apparatus according to claim 8,
- wherein when deletion of the first environment is detected, the first list updater updates information concerning the first environment in the first list.

12. The information processing apparatus according to claim 8, further comprising:
- a virtual environment deletion detector configured to detect deletion of the first environment, and acquire the discrimination information,
- wherein when deletion of the first environment is detected, the first list updater updates information concerning the first environment in the first list.

13. The information processing apparatus according to claim 2, further comprising:
- a virtual environment creation detector configured to detect creation of the first environment, the first environment being a virtual environment, and acquire fourth name information indicating a name in the name space of the second environment, of a directory storing an original file of the first software;
- a second converter configured to convert the first name information into fifth name information indicating a name of the original file in the name space of the second environment, based on the fourth name information;
- a second checker configured to acquire information on the original file, based on the fifth name information, check whether the acquired information on the first software matches information registered in a third list, and determine whether or not the first software is usable;
- a second software information acquirer configured to acquire information on the first software from the original file, based on the fifth name information when the first software is determined as usable; and
- a first list updater configured to register the information on the first software acquired from the original file to the first list when the first software is determined as usable.

14. The information processing apparatus according to claim 8, further comprising:
- a second checker configured to acquire information on the original file, based on the fifth name information, check whether the acquired information on the first software matches information registered in a third list, and determine whether or not the first software is usable;
- wherein the second software information acquirer acquires the information on the first software from the original file, based on the fifth name information when the first software is determined as usable, and
- the first list updater registers the information on the first software acquired from the original file to the first list when the first software is determined as usable.

15. The information processing apparatus according to claim 4, further comprising:
- an image identifier configured to identify an image file used in the first environment when the first environment is created,
- wherein the second list updater adds information indicating the identified image file to information concerning the first environment in the second list,
- in the first list, an image file that is usable in creation of the first environment or an image file that is not usable in creation of the first environment is registered, and
- the execution controller controls execution of the first software, based on a check result of the identified image file and the image file registered in the first list.

16. The information processing apparatus according to claim 2,
- wherein the first list is configured by a plurality of files respectively corresponding to the one or more virtual environments, and
- the first checker detects a file corresponding to the first environment from the plurality of files, and executes the check.

* * * * *